United States Patent
Kremer

[11] Patent Number: 6,103,981
[45] Date of Patent: Aug. 15, 2000

[54] TUMBLER SWITCH

[75] Inventor: Harm Kremer, Hoogeveen, Netherlands

[73] Assignee: U.S. Philips Corporation, New York, N.Y.

[21] Appl. No.: 09/292,408

[22] Filed: Apr. 15, 1999

[30] Foreign Application Priority Data

Apr. 15, 1998 [EP] European Pat. Off. .............. 98201199

[51] Int. Cl.$^7$ .............................. H01H 9/02; H01H 23/02
[52] U.S. Cl. ....................... 200/296; 200/302.3; 200/339
[58] Field of Search .................................. 200/294, 295, 200/296, 315, 339, 302.3, 302.2

[56] References Cited

U.S. PATENT DOCUMENTS

| 4,163,136 | 7/1979 | Piber | 200/296 |
| 4,461,938 | 7/1984 | Sorenson | 200/296 |
| 5,008,503 | 4/1991 | Stuhlmacher | 200/339 X |

FOREIGN PATENT DOCUMENTS 1542743 3/1979 United Kingdom ............. H01H 9/00

*Primary Examiner*—J. R. Scott
*Attorney, Agent, or Firm*—Ernestine C. Bartlett

[57] ABSTRACT

A tumbler switch for mounting in an opening in a wall having a base part and a tumbler which is pivotably connected to the base part between at least two positions, said tumbler having a splashproof edge portion. For mounting the switch from the inside of the wall, two opposite side parts of the tumbler are provided with recesses over the full length of the tumbler, the recesses cooperating projections, for example cams, provided in opposite edges of the opening in the wall. Resilient blade springs provided on the base part complete the fastening of the switch to the inside wall.

2 Claims, 2 Drawing Sheets

TUMBLER SWITCH

BACKGROUND OF THE INVENTION

The invention relates to a tumbler switch adapted to be mounted in an opening in a wall of an appliance, comprising a basic part having electrical switching contacts and contact terminals and having a tumbler secured to the basic part so as to be pivotable between at least two positions, which tumbler has a splash guard, which tumbler switch can be mounted in the opening in the wall from inside the appliance, an actuating portion of the tumbler extending at least partly through the opening in the wall after mounting, in such a manner that the splash guard is disposed on the inside of the appliance near the wall, two facing side walls of the tumbler having recesses situated between the splash guard and the actuating portion of the tumbler, projections arranged on two facing edges of the opening in the wall engaging in said recesses of the tumbler after mounting, and which basic part has at least two resilient limbs whose free ends engage against an inner surface of the wall after mounting.

Such a tumbler switch is known from GB-A-1542743. The actuating portion of the tumbler of said known switch is provided with a cap to be fastened to the tumbler. When the tumbler switch is mounted the switch, without the cap being fitted on the tumbler, is mounted perpendicularly to the wall on the inside of the appliance, the actuating portion projecting at least partly from the opening in the wall. The ends of the resilient limbs bear against an inner surface of the wall. Subsequently, the cap is snapped onto the tumbler from the outer side of the wall. In two facing side walls of the cap, in the center of the cap, partly circular recesses have been formed, in which recesses the projections of the edge of the opening in the wall engage after the cap has been fitted onto the tumbler. Thus, the recess is not obtained until the cap has been fitted onto the tumbler. For mounting said switch an additional part, i.e. a cap, to be fitted from the outside of the appliance is required. In another embodiment of this switch in accordance with GB-A-1542743 the partly circular grooves are formed directly in the side walls of the tumbler. Therefore, said embodiment does not have an additional cap. This switch is mounted by pushing the switch with the actuating portion through the opening from the inner side of the wall, for which the projections and hence the edge portions bounding the opening should recede to allow the passage of the tumbler. The projections are beveled to facilitate mounting. Although this last-mentioned method is a very simple method of mounting, such a switch appears to be rather susceptible to tolerances in practice. Not only should the walls of the various parts be flexible enough to allow the switch to be mounted but, besides, removal of the switch, for example for repair purposes, is not simple.

SUMMARY OF THE INVENTION

It is an object of the invention to provide a switch which can be mounted simply in an opening in a wall of an appliance from the inside of an appliance.

To this end, the invention is characterized in that the recesses between the splash guard and the actuating portion extend over the full length of the side walls of the tumbler. As a result of this, it is possible to mount the switch in the opening against the wall by means of a simple tilting movement of the switch, the projections engaging directly in the recesses. How exactly this is done will be described in detail with reference to the Figures.

A preferred embodiment of the switch is characterized in that at least one further side wall of the tumbler has a recess situated between the splash guard and the actuating portion of the tumbler, for receiving an end portion of one of the resilient limbs when the switch is mounted in the opening in the wall. After a switch has been mounted in an opening in a wall it is very desirable that the actuating portion fits as accurately as possible in the opening. This is not only for esthetic reasons but also in order to prevent splashing liquids from entering the appliance via the switch and coming into contact with electrical parts. Of course, the splash guard affords further protection against this. During the tilting movement of the switch, when the switch is mounted, one of the resilient limbs first extends through the opening. During the tilting movement an end portion of the resilient limb is then disposed between an edge of the opening and the tumbler. Without any further measures the thickness of the resilient limb is decisive for the gap formed between the actuating portion of the tumbler and the edge of the opening. As the tilting movement is completed the end portion of this resilient limb snaps behind the wall. In order to minimize the gap between the actuating portion and the edge of the opening after mounting, an end portion of the resilient limb engages a recess in the tumbler at the end of the tilting movement. Preferably, two facing side walls have such a recess, as a result of which no allowance is to be made for the position of the switch during mounting. Removal of the switch is very simple in that from the inside of the appliance one of the resilient limbs is urged back so far that it engages the recess in the actuating portion. Subsequently, the switch can be removed from the opening by a tilting movement in a direction opposite to that of the tilting movement during mounting.

BRIEF DESCRIPTION OF THE DRAWINGS

The invention will now be described in more detail with reference to an embodiment shown in the drawings. In the drawings

DESCRIPTION OF THE PREFERRED EMBODIMENTS

Figure 1:
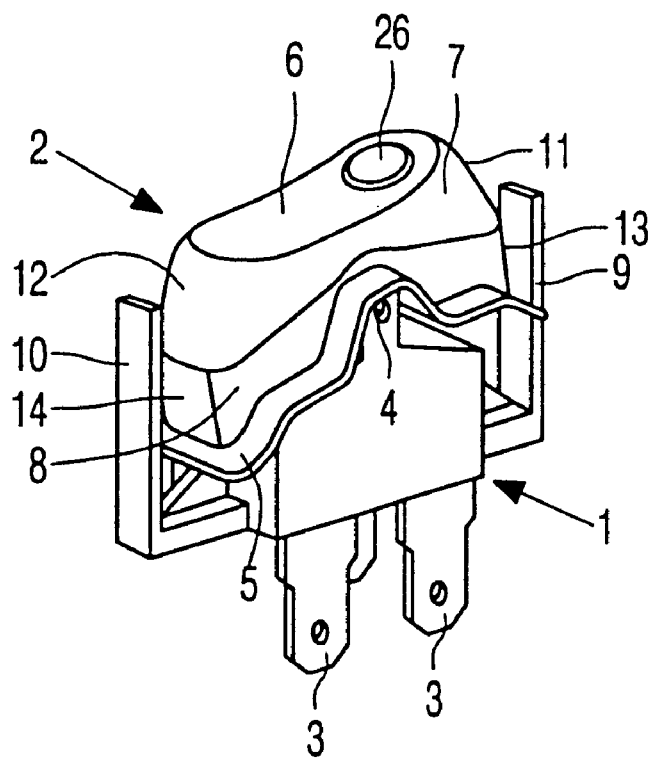
FIG. 1 is a perspective view of a tumbler switch in accordance with the invention.
Figure 2:
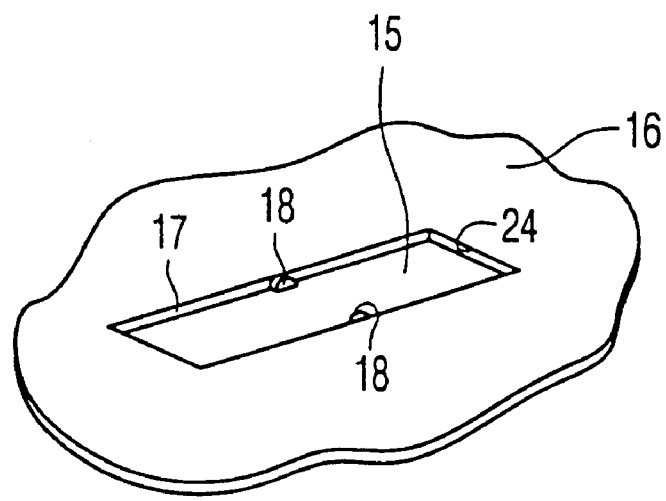
FIG. 2 shows an opening in a wall of an appliance.
Figure 3:
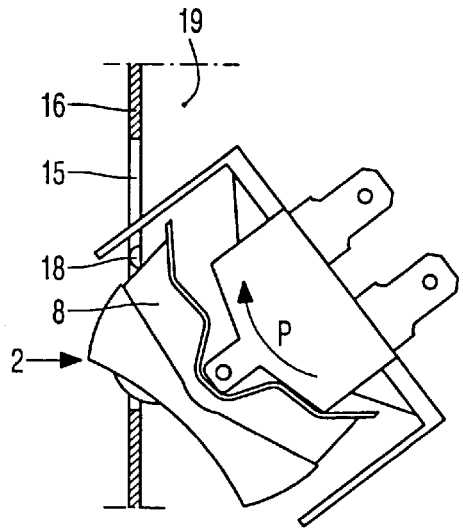
FIGS. 3 and 4 are side views of the switch of FIG. 1 during mounting of the switch in a wall.
Figure 4:
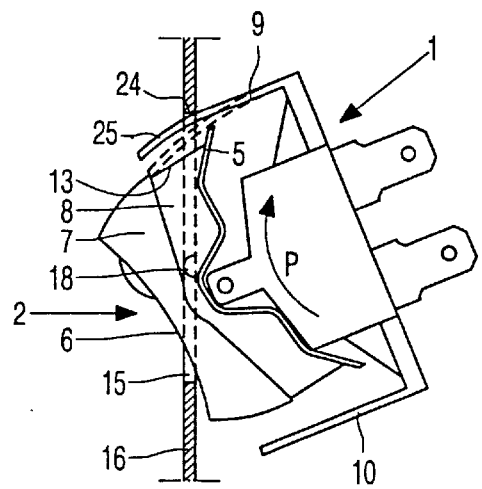
Figure 5:
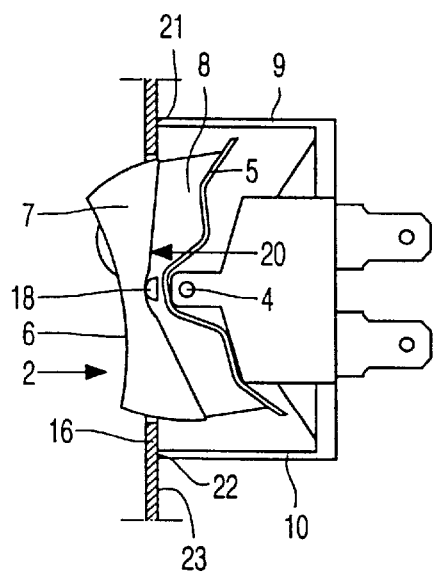
FIG. 5 is a side view of the switch of FIG. 1 after mounting.

The tumbler switch comprises a basic part 1 and a tumbler 2. The basic part 1 has electrical terminal lugs 3 and electrical switch contacts, not shown. The tumbler 2 is pivotably connected to the basic part 1 by means of a pivot 4. The tumbler can occupy two positions, usually one position in which an electrical circuit is closed and one position in which the circuit is open. However, alternatively, the tumbler can occupy for example three positions: two switching positions and one off-position. The tumbler switch is intended for mounting in a wall of an appliance. The tumbler has a splash guard 5 in the form of a kind of flange adjoining a lower edge of the tumbler. The tumbler further has an actuating portion 6, by means of which the user can set the tumbler to the desired position. Two facing long side walls 7 of the tumbler have recesses 8, which recesses are situated between the actuating portion 6 and the splash guard 5. Only one of the recesses 8 is visible in the Figures. These recesses extend over the full length of the side walls 7 of the tumbler. The recesses have been provided for the purpose of mounting the switch in a wall of the an appliance, as will be explained hereinafter. The basic portion further has two resilient limbs 9 and 10, which each face the respective short side wall 11 or 12 of the tumbler. Each of the short side walls 11, 12 of the tumbler also has a recess, 13 and 14 respectively, between the actuating portion 6 and the splash guard 5. In order to secure the switch in an opening 15 in a wall 16 of an appliance two facing edges 17 of the opening 16 has projections 18 "(preferably in the form of cams)" (see FIG. 2). The appliance itself is not shown. The switch is mounted in the opening 15 in the wall 16 in the following manner (see FIGS. 3–5): The switch is held in an oblique position and the tumbler 2 is placed obliquely into the opening 15 from the inside 19 of the appliance in such a manner that the projections 18 engage in the recesses 8 (FIG. 3). By tilting the switch as indicated by the arrow P the projections 18 slide through the recesses 8 (FIG. 4) and the switch is subsequently brought into the correct position as shown in FIG. 5. The projections 18 are then situated in the centers of the recesses 8, against a lower edge 20 of the actuating portion 6 and the ends 21, 22 of the resilient limbs 9, 10 bear against the inner surface 23 of the wall 16. In this way, the switch is secured in the opening in the wall. In the last stage of the tilting movement (see FIG. 4) the resilient limb 9 is urged against an edge 24 of the opening, as a result of which the limb 9 bends and an end portion 25 of the limb engages in the recess 13, as is indicated in broken lines. Owing to this recess the size of the opening can be minimized.

In the present example the switch has a rectangular shape with long sides and two short sides. Obviously, it is also possible for the switch to have a square shape or a slightly rounded shape with flattened sides. Furthermore, the switch may have a lamp 26.

What is claimed is:

1. A tumbler switch adapted to be mounted in an opening in a wall of an appliance, comprising a basic part having electrical switching contacts and contact terminals and having a tumbler secured to the basic part so as to be pivotable between at least two positions, the tumbler having a splash guard, the basic part and the tumbler being mountable in the opening in the wall from inside the appliance, an actuating portion of the tumbler extending at least partly through the opening in the wall after mounting, in such a manner that the splash guard is disposed on the inside of the appliance near the wall, two facing side walls of the tumbler having recesses situated between the splash guard and the actuating portion of the tumbler, projections arranged on two facing edges of the opening in the wall engaging in said recesses of the tumbler after mounting, and which basic part has at least two resilient limbs whose free ends engage against an inner surface of the wall after mounting, wherein the recesses between the splash guard and the actuating portion extend over the full length of the side walls of the tumbler.

2. A tumbler switch as claimed in claim 1, wherein at least one further side wall of the tumbler has a recess situated between the splash guard and the actuating portion of the tumbler, for receiving an end portion of one of the resilient limbs when the switch is mounted in the opening in the wall.

* * * * *